United States Patent [19]
Hillenbrand et al.

[11] Patent Number: 4,905,806
[45] Date of Patent: Mar. 6, 1990

[54] SYNCHRONIZING SHIFT CLUTCH TOOTHING ARRANGEMENT

[75] Inventors: Hans Hillenbrand, Ostfildern; Günter Wörner, Kernen, both of Fed. Rep. of Germany

[73] Assignee: Daimler-Benz AG, Stuttgart, Fed. Rep. of Germany

[21] Appl. No.: 237,333

[22] Filed: Aug. 29, 1988

[30] Foreign Application Priority Data

Aug. 29, 1987 [DE] Fed. Rep. of Germany ....... 3728903

[51] Int. Cl.⁴ ............................................. F16D 23/06
[52] U.S. Cl. .................................. 192/53 F; 192/108; 74/339
[58] Field of Search ................. 192/53 R, 53 E, 53 F, 192/53 G, 108; 74/339

[56] References Cited

U.S. PATENT DOCUMENTS

| | | | |
|---|---|---|---|
| 2,401,179 | 5/1946 | Orr | 192/53 F |
| 2,635,478 | 4/1953 | Wolfe | 192/53 F |
| 3,300,004 | 1/1967 | Peterson | 192/53 F |
| 3,737,016 | 6/1973 | Wörner | 192/53 F |
| 3,860,101 | 1/1975 | De Feo et al. | 192/53 G |
| 4,817,773 | 4/1989 | Knödel et al. | 192/53 F |

FOREIGN PATENT DOCUMENTS

| | | | |
|---|---|---|---|
| 972764 | 9/1959 | Fed. Rep. of Germany . | |
| 615507 | 1/1949 | United Kingdom | 192/53 R |
| 803979 | 11/1958 | United Kingdom . | |

Primary Examiner—Leslie A. Braun
Assistant Examiner—David A. Testardi
Attorney, Agent, or Firm—Barnes & Thornburg

[57] ABSTRACT

In a clutch toothing of a shift clutch, mutually confronting tooth ends of the clutch teeth of two clutch rings are equipped, for the axial insertion of the clutch teeth, with two angled unequal length sloping faces, which sloping faces have an equal length along the direction of the clutch axis and a common vertex. One clutch ring and a synchronizing ring mounted on the clutch rings so as to be rotatably and axially movable to a limited extent are equipped with matching blocking faces. The blocking faces of the respective rings likewise have the same axial extent along the axial direction of the clutch axis. To prevent renewed relative rotations after completed synchronism as a result of external forces on a synchronously unstable clutch ring, the vertex on the one clutch ring is offset in the direction of the relative rotation cancelling the synchronism and the vertex on the other clutch ring is offset in the opposite direction in relation to the tooth mid-plate, containing the clutch axis, of the respective clutch tooth.

2 Claims, 3 Drawing Sheets

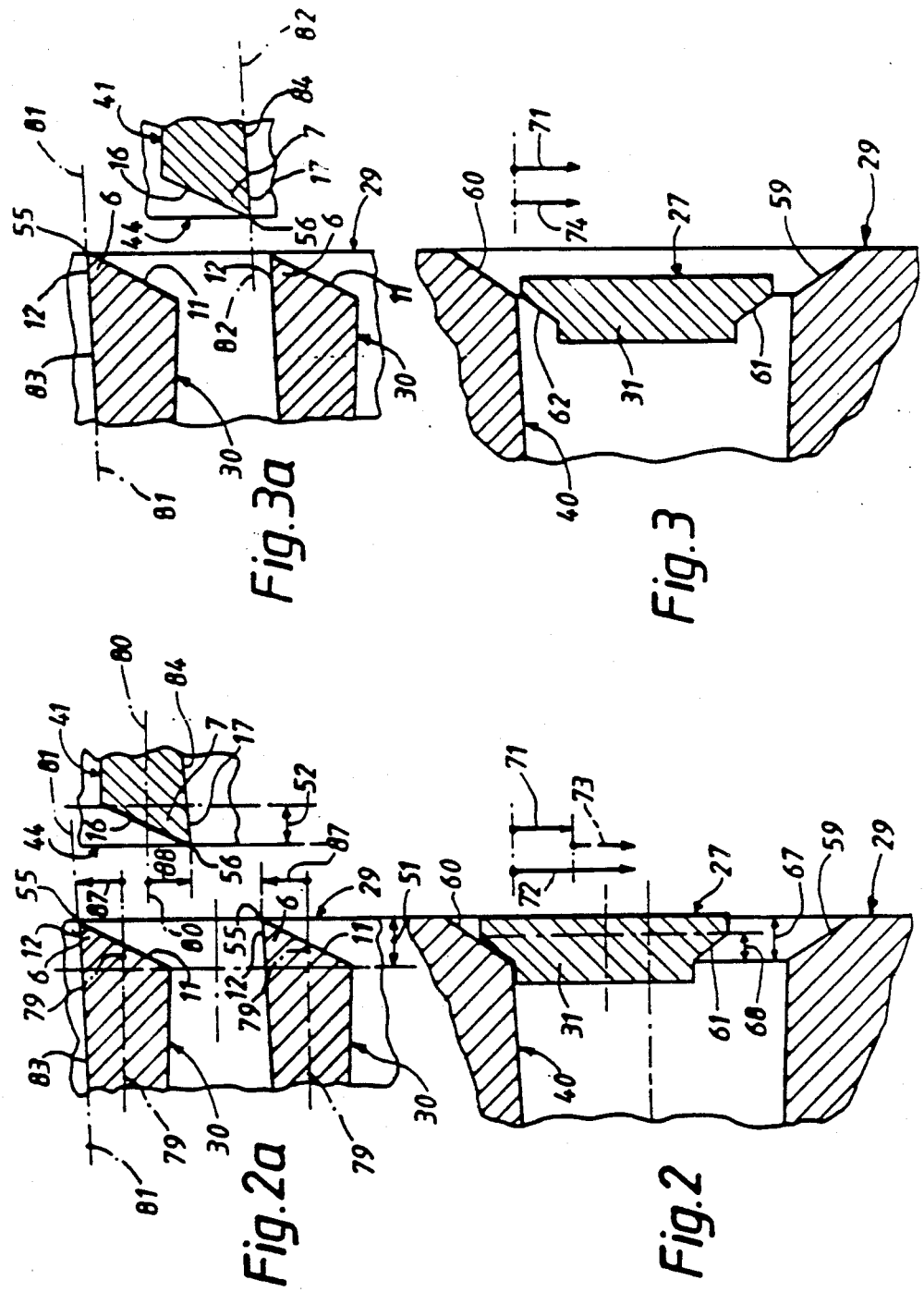

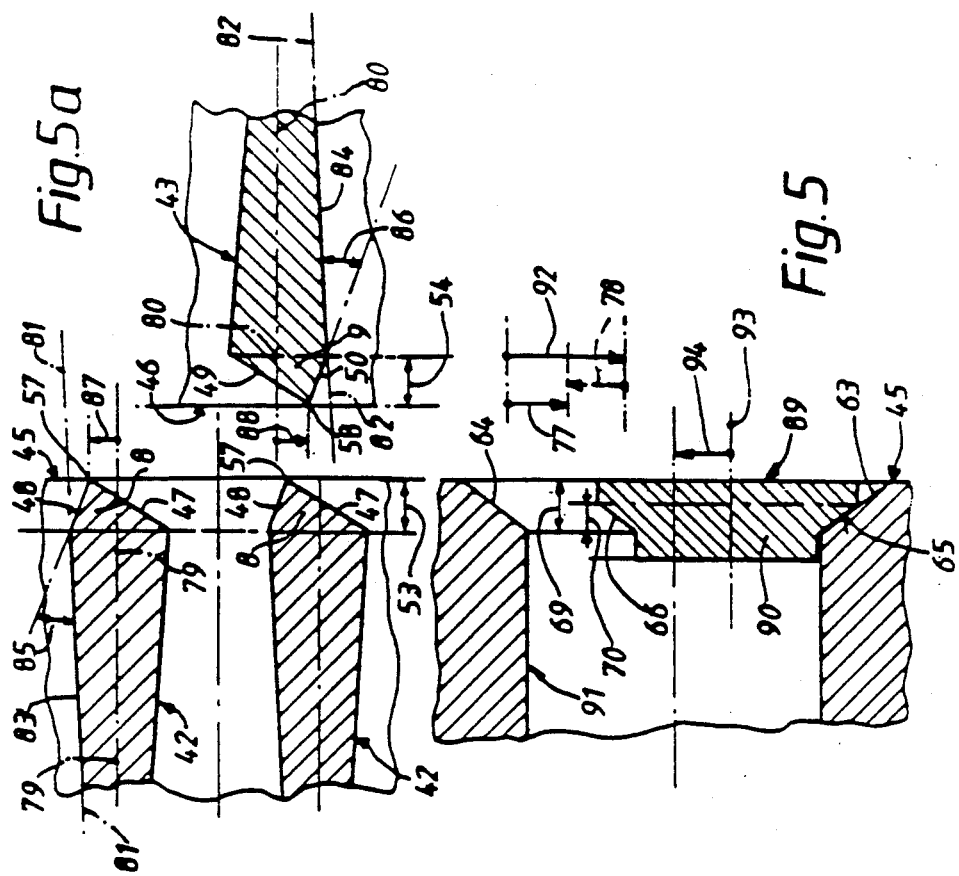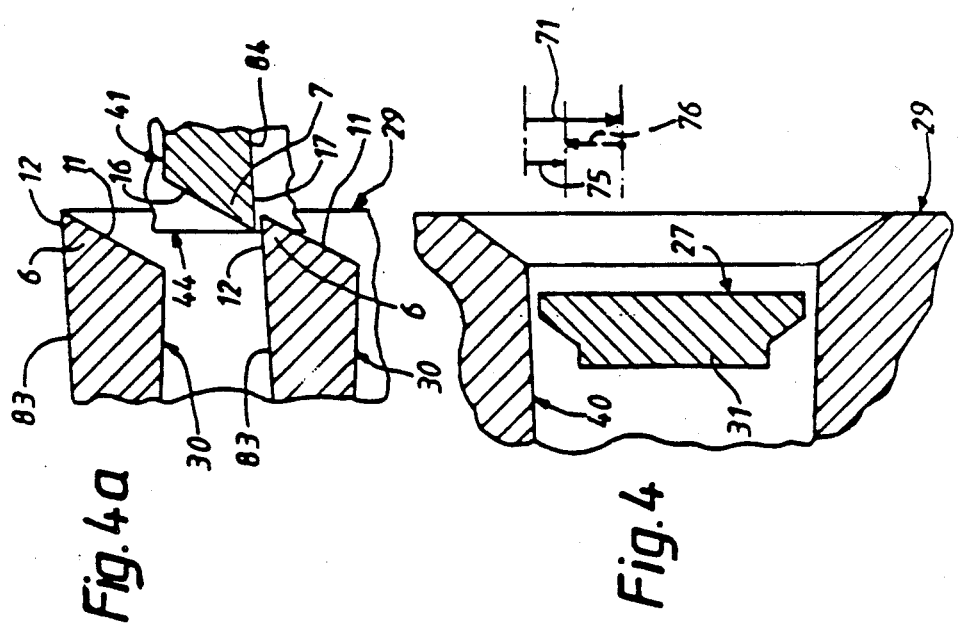

SYNCHRONIZING SHIFT CLUTCH TOOTHING ARRANGEMENT

BACKGROUND AND SUMMARY OF THE INVENTION

The invention relates to a synchronizing shift clutch toothing arrangement for use with change-speed transmissions for automotive vehicles and the like.

In known clutch toothings of this type (U.S. Pat. No 3,737,016), there is often the problem that, in terms of time, after the synchronism of the clutch halves which is obtained by means of the synchronizing means, and therefore when the blocking effect of the blocking teeth is cancelled, one of the two clutch halves can assume a synchronously unstable state as a result of external forces and therefore be incited to renewed relative rotation in relation to the other clutch half, even before the clutch teeth have come into engagement. Because of this relative rotation cancelling the synchronism, during the further shifting cycle disturbing noises or even material damage to the tooth ends occur at that moment when the latter butt against one another. Thus, in motor vehicle transmissions with a clutch toothing of the relative generic type, the so-called "cold scraping" is known in a one-to-two shift at relatively low outside temperatures. This phenomenon is caused by the fact that, after completed synchronism, as a result of the braking effect of the cold highly viscous transmission oil, the rotational speed of the shift gear wheel to be coupled to its transmission shaft during this shift decreases in relation to the constant rotational speed of the transmission shaft, as result of which, during the further actuation of the shift sleeve, the sloping faces of the tooth ends scratch against one another and thus produce the so-called "cold scraping".

In a known clutch toothing of a different generic type (German Patent No. 3,444,670), this problem is to be eliminated by making the blocking faces on the clutch ring fixed in terms of movement relative to the shift sleeve and having the synchronizing ring asymmetric, so that the blocking faces, at the front in relation to the running direction, have a greater axial extent than the blocking faces at the rear in relation to the running direction. This design necessitates a relatively large constructional length and cannot reliably prevent the so-called "cold scraping".

An object on which the invention is based is essentially, in clutch toothings in the type mentioned in the introduction, to prevent the above-mentioned disadvantages as regards disturbing noises, etc. in the shift phase between synchronism and the start of engagement, without increasing the constructional length.

According to the invention, this object is advantageously achieved by an arrangement wherein the vertex on the synchronously unstable clutch ring is offset in the direction of the relative rotation cancelling the synchronism and the vertex on the other clutch ring is offset in the opposite direction in relation to the tooth mid-plane, containing the clutch axis, of the respective clutch tooth.

In the clutch toothing according to preferred embodiments of the invention, the axial force components on the sloping faces, which counteract insertion in the shift phase mentioned, are reduced substantially, so that the clutch toothing of the synchronously unstable clutch ring incitable to renewed relative rotation is virtually intercepted by the clutch toothing of the other ring.

This intercepting effect is the most effective when the clutch toothing according to the invention has a design wherein the vertex of the angle of the sloping face is in the plane of the tooth flank offset in the same direction relative to the tooth mid-plane. In this arrangement, an axial repulsion of the clutch ring executing the shifting movement, that is to say the engaging movement, can no longer occur.

According to another advantageous design of preferred embodiments of the clutch toothing according to the invention, an arrangement is provided wherein the tooth has two angled sloping end faces the smaller of the two sloping faces forms with the plane of its adjacent tooth flank an angle of approximately 22°. This arrangement is preferred especially for those shift clutches, in which shifts occur with a differing direction of rotation of the synchronously unstable clutch halves, as happens, for example, in one-to-two upshifts and three-to-two down shifts of motor vehicle transmissions. In these cases, the shift gear wheel of the second gear has a higher rotational speed in the first gear and a lower rotational speed in the third gear than its transmission shaft, and therefore in downshifts there is no way of preventing the possibility that repulsion forces will be detectable on the larger sloping face, which in this shift operation has to perform the function of insertion, because of a possible too low inclination in relation to the peripheral direction. These disadvantages are avoided in the design of the clutch toothing according to the above noted preferred embodiments of the invention.

Other objects, advantages and novel features of the present invention will become apparent from the following detailed description of the invention when considered in conjunction with the accompanying drawings.

BRIEF DESCRIPTION OF THE DRAWINGS

FIG. 2 shows a sectional representation, corresponding to that of FIG. 1a, in a developed view of another position of the engagement block;

FIG. 2a shows a sectional representation in a developed view through the clutch toothing according the invention in the first embodiment along the line IIa—IIa of FIG. 1, with the mutual position of the clutch teeth which is associated with the position of the engagement block of FIG. 2;

FIG. 3 shows a sectional representation, corresponding to that of FIG. 1a, in a developed view of a further position of the engagement block of the shift clutch of FIG. 1;

FIG. 3a shows a sectional representation, corresponding to the representation of FIG. 2a, in a developed view through the clutch toothing according to the invention in the first embodiment, with the position of the clutch teeth which is associated with the position of the engagement block of FIG. 3;

FIG. 4 shows a sectional representation, corresponding to that of FIG. 1a, in a developed view of a further position of the engagement block of the shift clutch of FIG. 1;

FIG. 4a a sectional representation, corresponding to the representation of FIG. 2a, in a developed view through the clutch toothing according to the invention in the first embodiment, with the position of the clutch teeth which corresponds to the position of the engagement block of FIG. 4;

FIG. 5 shows a sectional representation, corresponding to that of FIG. 1a, in a developed view through the engagement block in another position of a shift clutch with a clutch toothing according to the invention in a second embodiment; and FIG. 5a a sectional representation, corresponding to the representation of FIG. 2a, in a developed view through the clutch toothing according to the invention in the second embodiment, with the position of the clutch teeth which is associated with the position of the engagement block of FIG. 5.

DETAILED DESCRIPTION OF THE DRAWINGS

Figure 1:
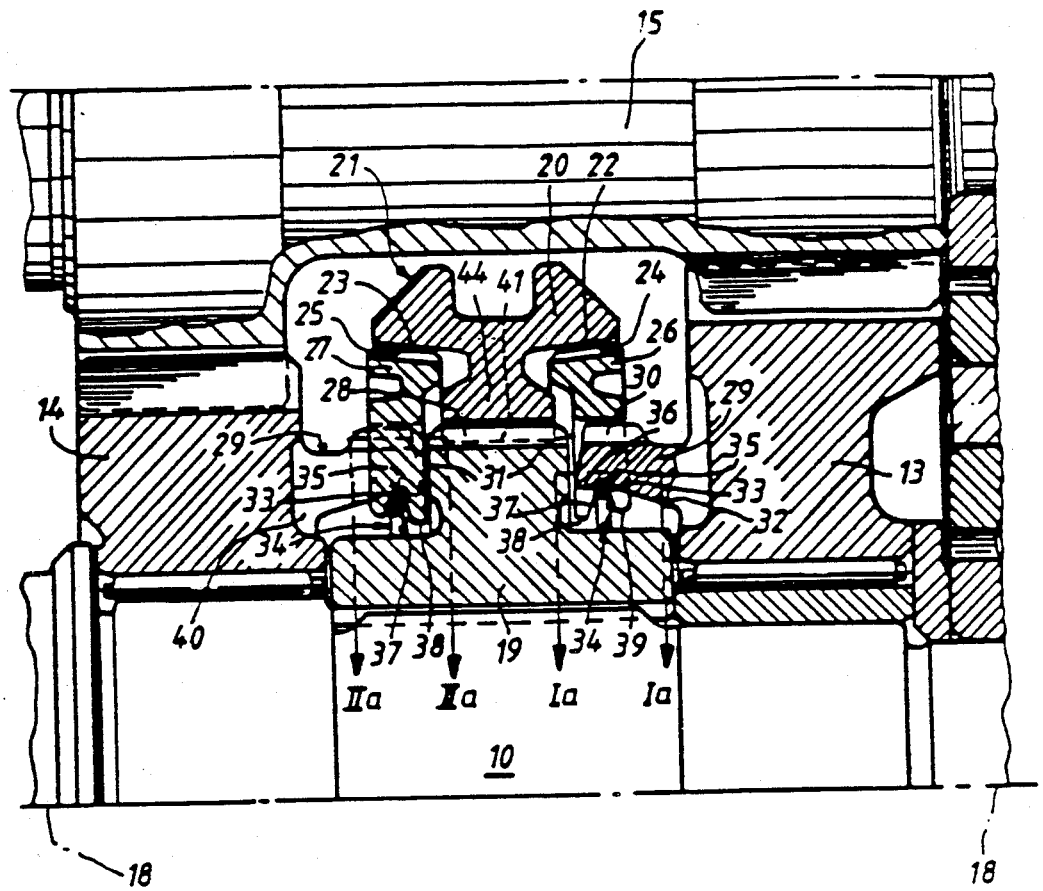
FIG. 1 shows a part section through a gear-change transmission of the countershaft type in a plane containing the axis of a transmission output shaft, with a shift clutch having clutch toothing constructed according to a preferred embodiment of the invention.
Figure 1A:
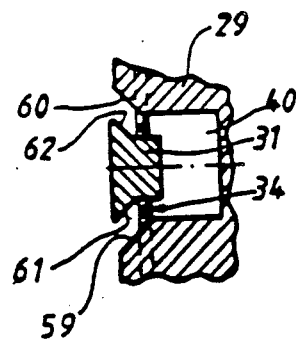
FIG. 1a shows a part section in a developed view along the line Ia—Ia of FIG. 1 through the engagement block of the shift clutch of FIG. 1.

With reference to FIGS. 1 and 1a, a transmission output shaft 10 and a parallel countershaft 15 are mounted so as to be rotatable and axially non-displaceable in a transmission case (not shown in more detail) of a gear change transmission of a motor vehicle. A guide ring 19, having an outer clutch toothing 28, is secured fixedly in terms of relative rotation and axially non-displaceably on a middle portion of the transmission output shaft 10. A sliding shift sleeve 20 of a gear change shift clutch 21 engages into the outer clutch toothing 28 constantly fixedly in terms of relative rotation and axially displaceably by means of a matching inner clutch toothing 41 of a clutch ring 44 which is made in one piece with the sliding shift sleeve 20.

Shift gear wheels 13 and 14 arranged on both sides of the guide ring 19 are mounted rotatably per se on the transmission output shaft 10 and are each made in one piece with a respective clutch ring 29 arranged concentrically on their end faces confronting the guide ring 19. The clutch rings 29 are each equipped with an outer clutch toothing 30, into which the inner clutch toothing 41 of the clutch ring 44 is alternatively engageable. Synchronizing rings 26 and 27 are arranged in the following way on each of the clutch rings 29 so as to be rotatably and axially movable to a limited extent.

The synchronizing rings 26, 27 are each equipped with three extensions 31 which project radially inwards into matching recesses 40 of the respective clutch ring 29 and which each terminate in two prolongations 38 and 39 arranged in a fork-shaped manner. The common vertex of the prolongations 38 and 39 forms a peripheral groove 33 of semicircular cross-section, into which an annular spring 34 slotted in peripheral direction is set under slight pre-stress. The prolongations 38 adjacent to the guide ring 19 are equipped with a conical guide face 37 for the springing-in movements of the annular spring 34. The clutch rings 29 are designed on their inner periphery as an inner cone with a cone face 32 terminating, in the region of the wide open cone end, in a peripheral groove 35, into which the respective annular spring 34 engages in the illustrated disengaged clutch position or neutral position of the sliding shift sleeve 20. The clutch rings 29 are equipped, in their region located between the peripheral groove 35 and the respective wide cone end, with a radially inner extension 36 which is used as a stop for the annular spring 34 in the neutral position. Interposed between each of the synchronizing rings 26 and 27 and the other clutch ring 44 is a frictional synchronizing clutch in the form of matching cone faces 22, 23 and 24, 25 on the sliding shift sleeve 20 in one piece with the clutch ring 44 and on the respective synchronizing ring 26 and 27. Finally, each clutch ring 29 has blocking faces 59 and 60 which start from its recesses 40 and extend inclined relative to the clutch axis 18—18 and which interact with matching blocking faces 61 and 62 on the extensions 31 of the respective synchronizing ring 26 or 27.

With reference to FIGS. 2 to 4a, the blocking faces 59 and 60, starting from the recesses 40, of the clutch rings 29 have the same axial extent 67. The same applies to the matching blocking faces 61 and 62 on the extension 31 of the synchronizing rings 27 and 27, which have the same axial extent 68.

FIGS. 2, 3 and 4 illustrate three different shift states during the shifting of the second gear, in which the sliding shift sleeve 20 is actuated in the direction of the shift gear wheel 14 in order to engage the clutch toothing 41 into the clutch toothing 30 of the clutch ring 29 of the shift gear wheel 14. During this shifting operation, the rotational speed or peripheral speed 71 of the transmission output shaft 10 remains constant in all these three shift states, while the shift gear wheel 14 has a higher rotational speed or peripheral speed 72 at the start of the shifting operation (FIG. 2), consequently here executing an overtaking relative rotation 73 in relation to the transmission output shaft 10.

In the shift state of FIG. 2, the synchronizing clutch 23, 25 has just come into engagement and thereby the synchronizing ring 27 changed over to its blocking position which is associated with the relative rotation 73 and in which the blocking faces 60 and 62 have come into engagement and thereby a further displacement of the sliding shift sleeve 20 is blocked for the time being. The annular spring 34 is now located on the steep transition from the Peripheral groove 35 to the cone face 32, so that a high frictional or braking force can be built up on the synchronizing ring 27 and therefore, via the blocking faces 60, 62, also on the clutch ring 29, until the shift gear wheel 14, together with the countershaft 15, is braked up to the synchronism of the clutch rings 29 and 44.

This state of synchronism is shown in FIG. 3, in which the rotational speed or peripheral speed 74 of the clutch ring 29 of the shift gear wheel 14 is now equal to the rotational speed or peripheral speed 71 of the transmission output shaft 10. In the synchronous state, as a result of the backward rotation, the respective extension 31 can enter its recess 40, so that the blocking faces 61 and 62 come out of the axial region of engagement of the blocking faces 59 and 60 (FIG. 3). If external forces now take effect on the shift gear wheel 14 before a positive connection has been made between the clutch toothings 30 and 41, for example the resistance of cold highly viscous transmission oil having the effect of a braking force, the shift gear wheel 14 which, in this phase, is in a synchronously unstable state is now braked relative to the transmission output shaft 10, so that its rotational speed or peripheral speed 75 (FIG. 4) decreases in relation to the constant rotational speed or peripheral speed 71, that is to say the shift gear wheel 14 together with its clutch ring 29 is incited to a relative rotation 76 cancelling the synchronism.

The clutch teeth 30 of the clutch ring 29 of the shift gear wheel 14, on the one hand, and the clutch teeth 41 of the clutch ring 44 of the sliding shift sleeve 20 on the other hand, have, on their tooth ends 6 and 7 located opposite one another in the clutch disengagement position (FIGS. 2a, 3a and 4a), two sloping faces 11 and 16 for mutual insertion after completed synchronism, which join together to form an acute vertex 55 and 56.

The sloping faces 11 at the clutch ring 29 all have the same axial extent 51. Likewise, all the sloping faces 16 of the clutch toothing 41 of the other clutch ring 44 have the same axial extent 52. The vertex 55 on the respective clutch tooth of the clutch toothing 30 is offset in the direction 87 (FIG. 2a) of the relative rotation 76 (FIG. 4) cancelling the synchronous state in relation to the tooth mid-plane 79-79 containing the clutch axis 18-18 (and perpendicular to the drawing plane of FIG. 2a). At the same time, the amount of the offset is selected so that the vertex 55 together with the tooth flank face portion 12 and the tooth flank 83 offset in the same direction is in one plane 81-81.

The vertex 56 on the respective clutch tooth of the clutch toothing 41 on the other clutch ring 44 is offset in the direction 88, opposite to the direction 87 of the relative rotation 76, in relation to the tooth mid-plane 80-80 containing the clutch axis 18-18 (and perpendicular to the drawing plane of FIG. 2a). Here too, the amount of the offset is selected so that the vertex 56 together with the tooth flank face portion 17 and the tooth flank 84 offset in the same direction are in one plane 82-82.

When the shift gear wheel 14 synchronously unstable in the shifting state of FIG. 3a is braked during the further displacement of the clutch toothing 41 in the direction of the clutch ring 29, the tooth flanks 83 aligned with the tooth flank face portion 12 are intercepted by the tooth flank face portion 17 aligned with the toothed flank 84, without the possibility of appreciable relative rotation and associated noises, such as "cold scraping" and the like. Also, no repulsion forces directed counter to the shifting movement can occur between the tooth flanks 83, 84 because these faces deviate only slightly from the direction of the clutch axis 18-18.

In the embodiment of FIGS. 5 and 5a, a clutch ring 45 of the shift gear wheel 14 and a clutch ring 46 of the sliding shift sleeve 20 are equipped with matching clutch toothings 42 and 43, of which the tooth ends 8 and 9 located opposite one another in the clutch disengagement position are each equipped with two sloping faces 47, 48 and 49, 50 which join together to form a common vertex 57 and 58. The sloping faces 47 and 48 of the clutch ring 45 all have the same axial extent 53. Likewise, all the sloping faces 49 and 50 on the clutch ring 46 have the same axial extent 54.

A synchronizing ring 89 mounted on the clutch ring 45 so as to be rotatably and axially displaceable to a limited extent by means of an inner core and an annular spring is equipped with radially inner extensions 90 projecting into matching recesses 91 on the clutch ring 45. The clutch ring 45 is equipped with blocking faces 63 and 64 which start from its recesses 91 and which all have the same axial extent 69. The synchronizing ring 89 is equipped with matching blocking faces 65 and 66 which are on its extensions 90 and which likewise all have the same axial extent 70.

The vertex 57 of the sloping faces 47, 48 of the clutch toothing ring 42 is offset in the direction 87 of the relative rotation 76 (FIG. 4) of the shift gear wheel 14 (and consequently of the associated clutch ring 45) cancelling the synchronism, in relation to the tooth mid-plane 79-79 containing the clutch axis 18-18 (and perpendicular to the drawing plane of FIG. 5a). The amount of the offset is selected so that the smaller sloping face 48 forms with the plane 81-81 of the tooth flank 83 offset in the same direction an angle 85 of approximately $22° \pm 2°$.

The vertex 58 of the sloping faces 49 and 50 on the clutch ring 46 is offset in the direction 88 opposite the direction 87 of the relative rotation 76 (FIG. 4) cancelling the synchronism, in relation to the tooth sloping face 50 forms with the plane 82-82 of the tooth flank 84 offset in the same direction an angle 86 which likewise amounts to $22° \pm 2°$.

Otherwise, the block-synchronized shift device or shift clutch for the second gear of FIGS. 5 and 5a is identical to the shift device for the second gear of FIGS. 1 and 1a.

FIG. 5 illustrates diagrammatically a shift state in a downshift from third gear to second gear. In third gear, the shift gear wheel 14 and consequently the associated clutch ring 45 has a rotational speed or peripheral speed 47 which is less than the rotational speed or peripheral speed 92 of the transmission output shaft 10 or of the clutch ring 46 connected to the latter fixedly in terms of relative rotation. Consequently, even before synchronism is reached, the clutch ring 45 executes in relation to the other clutch ring 46 a relative rotation 78 which has the same direction 87 as the relative rotation 76 (FIG. 4) cancelling the synchronism during the upshift into second gear.

Now when the synchronizing clutch comes into engagement with the cone faces 23 and 25 in the downshift to second gear, as a result of the relative rotation 78 of the clutch ring 46 the synchronizing ring 89 changes over to the blocking position 93 which is shown in FIG. 5 and in which the blocking faces 63 and 65 are engaged. As a result of an increase in the shifting force, the clutch ring 45, together with the shift gear wheel 14 and the countershaft 15, is accelerated until there is synchronism between the clutch rings 45 and 46 and the synchronizing ring 89 can, with its extensions 31, enter the recesses 91 of the clutch ring 45 by means of backward relative rotation 94. The clutch teeth 43 of the clutch ring 44 of the sliding shift sleeve 20 are also subjected to this relative rotation 94, so that the larger sloping faces 49 on the clutch teeth 43, together with the matching larger sloping faces 47 on the clutch teeth 42, bring about the insertion of the two clutch toothings 42, 43 after completed synchronism.

With the same axial extent 53 and 54 of the sloping faces 47 and 49 and with the same remaining dimensions of the clutch teeth 42 and 43, the axial repulsion forces between the sloping faces and counteracting insertion are the lesser, the flatter the path of the sloping faces in relation to the clutch axis 18-18. This path is the flatter, the larger the angle 85 or 86 provided according to the invention. According to the invention, the angles 85 or 86 are calculated only large enough to ensure that neither the interception function of the smaller sloping faces 48 and 50 under relative rotations 76 (FIG. 4, 4a) interrupting synchronism during an upshift, nor the insertion function of the larger sloping faces 47 and 49 after completed synchronism during a downshift are impaired by repulsion forces which are too high.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Clutch toothing of a block-synchronized shift clutch especially of a gear-change transmission with gear wheels disconnectable from a shaft, in which tooth ends, confronting one another in the disengaged clutch position and located on respective end faces, of clutch teeth of two clutch rings axialy displaceable relative to one another are equipped, for the insertion of the clutch teeth, with two angled, unequal length sloping faces which sloping faces have an equal length in a direction of the clutch axis and a common vertex, one said clutch ring and a synchronizing ring mounted on the one said clutch ring so as to be rotatably and axially movable to a limited extent having matching blocking faces, and the respective blocking faces of the one said clutch ring likewise each having the same axial extent in the directions of the clutch axis, wherein that the vertex on the one said clutch ring is offset in the direction of a relative rotation cancelling the synchronism and the vertex on the other clutch ring is offset in the opposite direction in relation to a tooth mid-plane, containing the clutch axis, of the respective clutch tooth.

2. Clutch toothing according to claim 1 wherein the smaller of the two sloping faces on at least one of said clutch teeth forms an angle of approximately 22° with a respective tooth flank.

* * * * *